June 1, 1965    R. B. COLTEN ETAL    3,187,247
REPRODUCING APPARATUS
Original Filed Sept. 2, 1959    6 Sheets-Sheet 1

INVENTORS
Robert B. Colten,
Glenn E. Wanttaja &
BY August F. Scarpelli
Hugh L. Fisher
ATTORNEY June 1, 1965     R. B. COLTEN ETAL     3,187,247
REPRODUCING APPARATUS
Original Filed Sept. 2, 1959     6 Sheets-Sheet 3

INVENTORS
Robert B. Colten,
BY   Glenn E. Wanttaja &
August F. Scarpelli

Hugh L. Fisher
ATTORNEY

INVENTORS
Robert B. Colten,
Glenn E. Wanttaja &
August F. Scarpelli
BY
Hugh L. Fisher
ATTORNEY INVENTORS
Robert B. Colten,
Glenn E. Wanttaja &
August F. Scarpelli
BY Hugh L. Fisher
ATTORNEY

United States Patent Office 3,187,247
Patented June 1, 1965

3,187,247
REPRODUCING APPARATUS
Robert B. Colten, Santa Barbara, Calif., Glenn E. Wanttaja, Hales Corners, Wis., and August F. Scarpelli, Warren, Mich., assignors to General Motors Corporation, Detroit, Mich., a corporation of Delaware
Original application Sept. 2, 1959, Ser. No. 837,607. Divided and this application Oct. 12, 1961, Ser. No. 144,678
3 Claims. (Cl. 318—257)

This invention relates to improvements in reproducing apparatus adapted, although not exclusively, for machining reproductions of contours from a pattern on a workpiece.

This is a division of the co-pending application Serial No. 837,607 filed September 2, 1959, and entitled Reproducing Apparatus.

In general, since reproducing apparatus must function rapidly and accurately, automatic operation is preferred, manual operation being slow and inacurate, even though the operator has a high degree of skill. But for automatically operating reproducing apparatus to be effective, i.e., versatile and adaptable for different applications, it must be capable of accomplishing without complexity at least as many operations as can be achieved with manual apparatus. For example, automatically operating reproducing apparatus should desirably be capable of copying lines from a drawing or a blueprint as distinguished from expensively formed master drafts, be capable of following irregular contours without the copying tool leading or lagging the tracer mechanism so as to induce errors into the final result, be uninfluenced by lines intersecting those to be copied, be capable of being placed on-course quickly and any extreme off-course errors should not be permitted to destroy the workpiece, and be stable and instantaneously responsive and devoid of influence from speed fluctuations.

With the foregoing in mind, the invention contemplates an automatically operating reproducing apparatus that is capable of copying irregular contours rapidly and accurately, that has a unique arrangement for copying a selected one of a series of intersecting lines, that provides novel modes both of getting on-course quickly and of stopping the apparatus when off-course, that has provision for removing speed fluctuations and inducing stability into the system and for instantly responding with constant speed operation, that is particularly suited for copying from any type master draft, that accommodates different size workpieces so mounted as to inhibit the influence of vibrations, e.g., copying tool "chatter," that may be adjusted for different size cutting tools, and that can copy contours requiring 180° arcuate travel.

Because it is desirable to copy from almost any type master draft such as blueprints, photostats, etc., a tracer mechanism for the automatic reproducing apparatus often utilizes some form of radiant energy to produce information pulses, e.g., photocells may be employed to sense off-course errors and develop corresponding error signals. The photocells when used in pairs frequently, although identical, have different outputs at times when the outputs thereof should be balanced to indicate no off-course error. Moreover, when the photocells are balanced for one condition of lighting and reflectivity, they are often out of balance when these conditions change. The outputs from these photocells must be picked up in such a manner as to be free of noise and these signals must afford both corrections for parallel misalignments and lateral displacements relative to the contour being traced. The development of these error signals as well as some provision for causing the copying tool to be maneuvered in accordance therewith, also present problems.

Accordingly, the invention provides the reproducing apparatus with a unique tracer mechanism that incorporates photosensitive means for detecting both parallel misalignments and lateral deviations thereof with respect to a contour to be traced, that has an unusual system for resolving these signals and causing an equivalent signal to be developed for controlling movement of the copying tool, that eliminates noises during pickup of the error signals, and that has a novel mode of calibrating the photosensitive means for different lighting conditions and master drafts of different degrees of reflectivity.

Although automatic control is desired, the apparatus should be capable of manual control at certain times, e.g., provision should be made for preparing the apparatus manually for automatic operation without any excessive loss in time. With both manual and automatic controls available, then both must be coordinated so as to insure against the possibility of one system leading or lagging the other such that a workpiece could be ruined. Also, in pursuing a certain contour, it may become necessary to maintain a selected course despite the tendency for the automatic control to demand otherwise.

Therefore, the invention incorporates both manual and automatic controls so coordinated as to be synchronized and permit either automatic or manual control at any time without concern for any lost motion due to leading or lagging between the two controls. Also by the invention, under critical operating conditions as when crossing intersecting lines, the existing course can be maintained without the intersecting line influencing the operation.

When the reproducing apparatus is of considerable size, or when it is necessary to position the controls such that the operation of the copying tool relative to the workpiece is difficult to observe by the operator, or when personal safety prevents close observation of the apparatus, it becomes difficult to view the relative movements between the copying tool and the workpiece.

For this reason, the invention provides an operator control station remotely positioned from the apparatus, with an unusual system for visually observing the performance of the copying tool.

In promoting accuracy of the finished contour, chips removed during machining operation can produce interference as well as obscure the cutting action if a substantial amount of metal is being removed. To overcome this problem, the invention affords a mode of quickly withdrawing removed chips from the cutting area. Specifically, the invention employs a vacuum pressure system for removing the chips from the proximity of the cutting tool and the workpiece through the spindle of the cutting tool.

Generally, reproducing apparatus employs a table or the equivalent of a size adequate to accommodate the largest master draft for which the apparatus is designed. Necessarily, the draft table will be of a relatively large size, and therefore, when small drafts as well as small drawings are to be traced, it is advantageous if the small drawing can be positioned anywhere on the draft table. This permits several such small drawings to be simultaneously attached to the draft table so that the interruption of one tracing operation for another does not require interchanging of the drafts. For this feature to be possible, the apparatus usually in some way must be adjusted for the change of position of the draft on the table. To do this requires major adjustments between the tracer mechanism and the copying tool and involves expensive and complex structures.

The invention, therefore, contemplates apparatus of the preceding character that is suited for copying master drafts attached to any part of a draft table. More particularly, the invention affords an adjustable workpiece support that permits the workpiece to be positioned on any part thereof so as to correspond to the disposition of the master draft on the draft table. Additionally, by the arrangement, the disposition of the tool support relative to the workpiece affords further support for the workpiece.

The foregoing and other objects and advantages of the invention will be apparent from the following description and the accompanying drawings in which.

Figure 7:
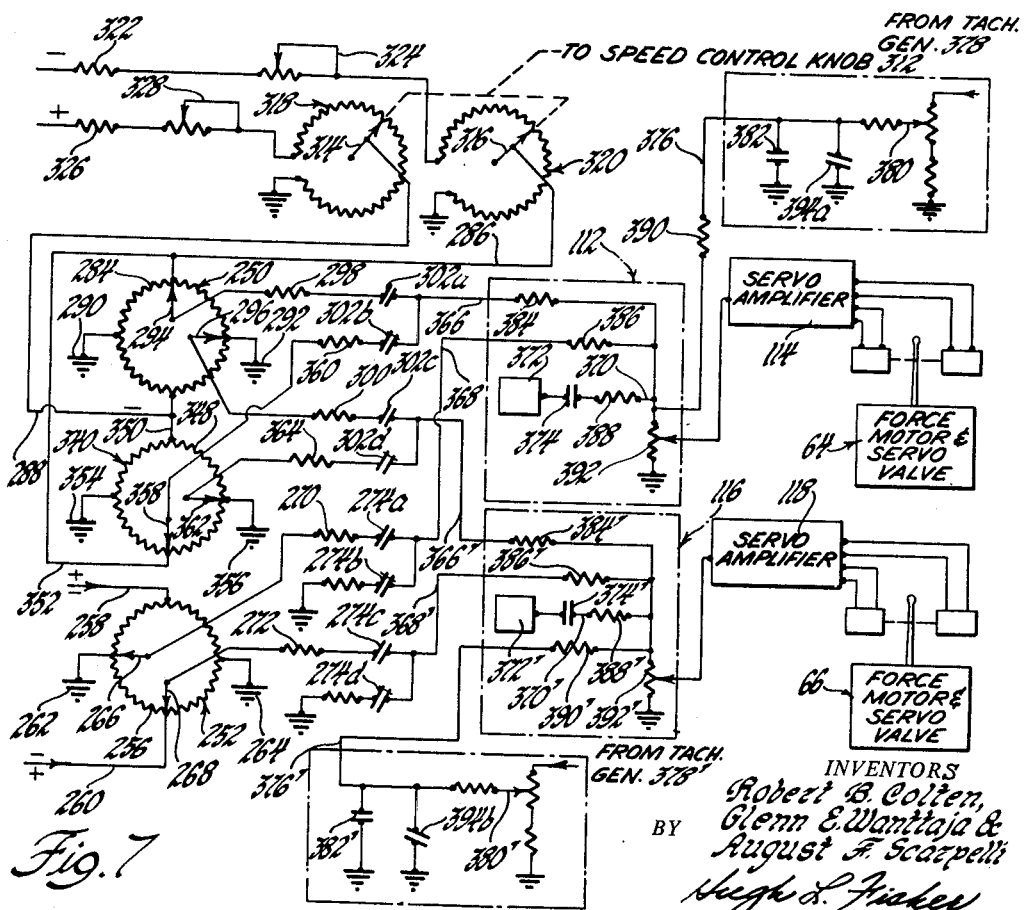
Figure 8:
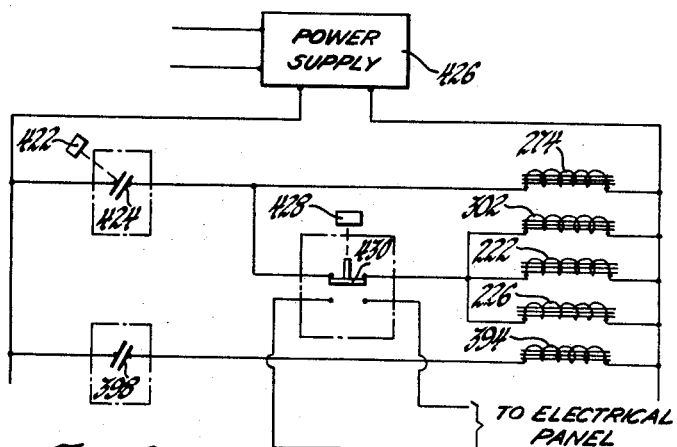
Figure 9:
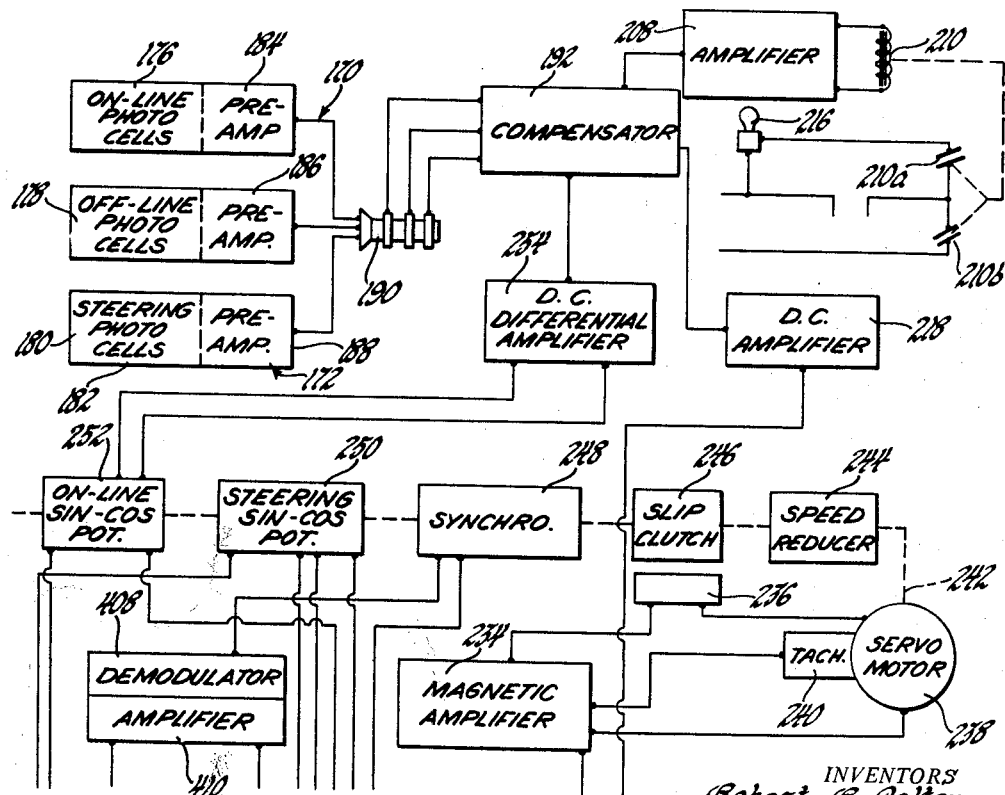
Figure 9A:
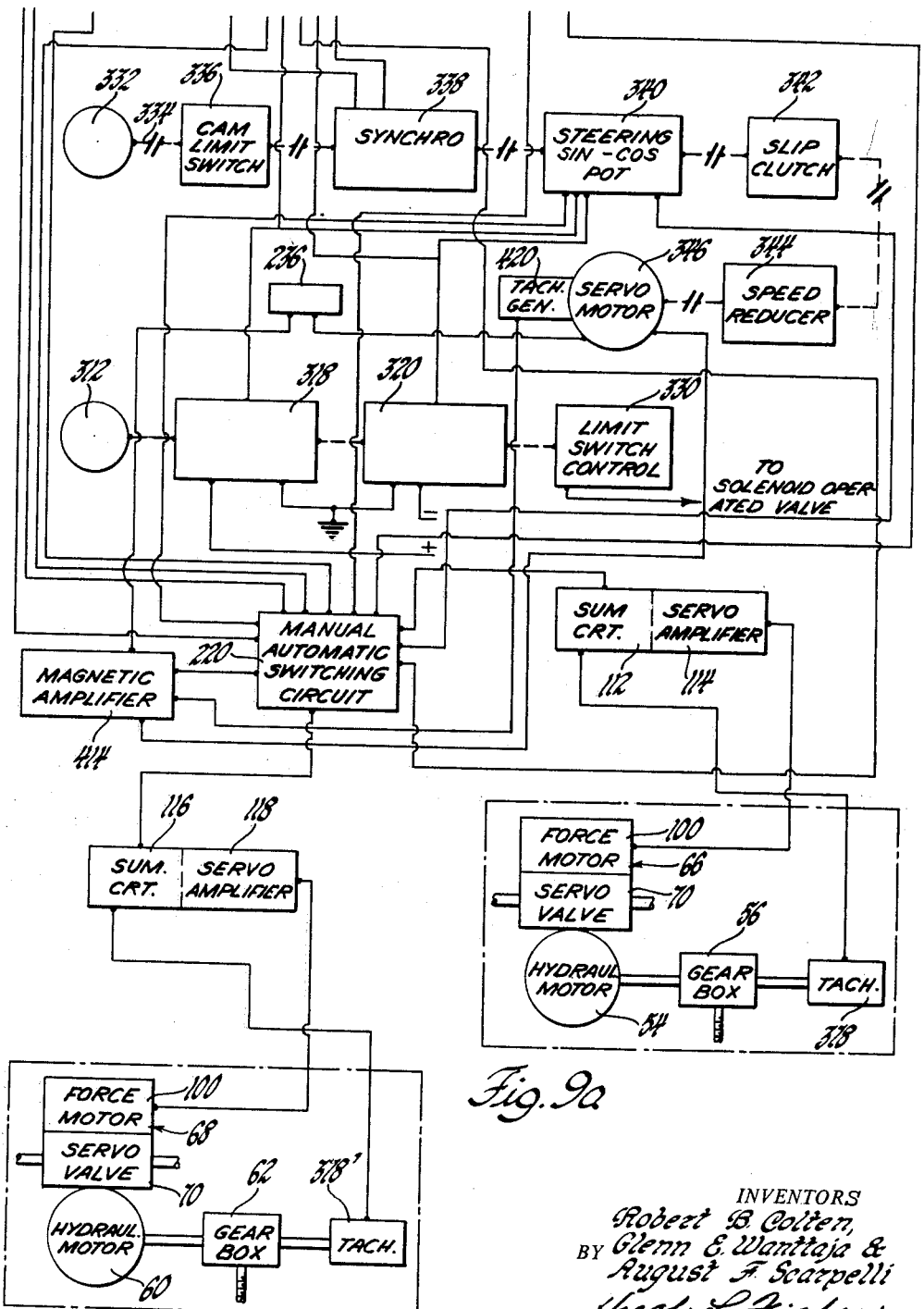

FIGURES 4a, 4b, 4c, and 4d are diagrammatic showings illustrating different operating phases of a tracer mechanism for the apparatus;

FIGURES 5, 6, 7, and 8 are diagrams of circuits employed by the tracer mechanism; and FIGURES 9 and 9a are block diagrams of the apparatus control system.

GENERAL ARRANGEMENT

Figure 1:
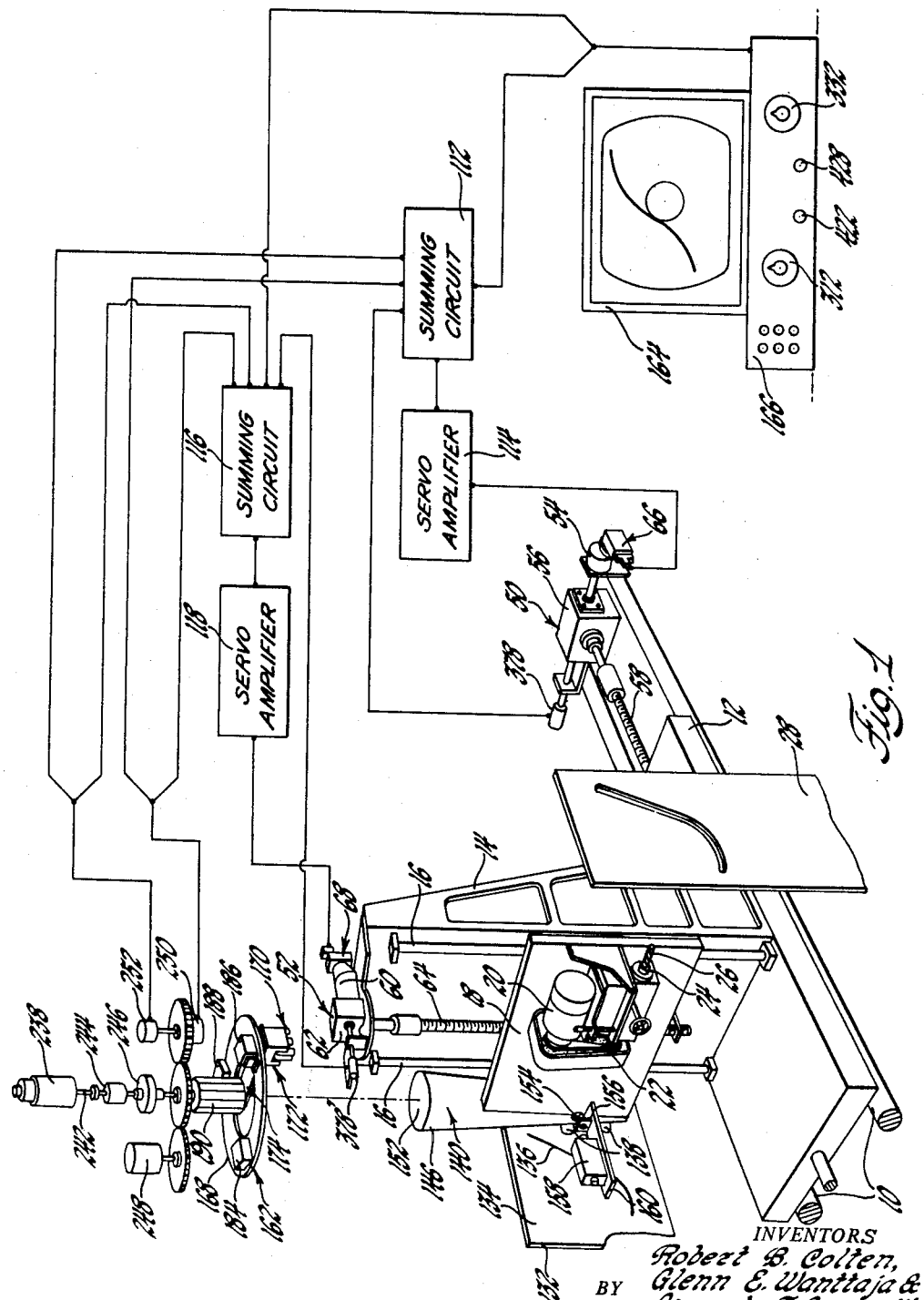
FIGURE 1 is a perspective view of a reproducing apparatus demonstrating the principles of the invention.

Referring to FIGURE 1 in detail, the reproducing apparatus depicted has horizontal guideways 10 suitably supported on a base (not shown) or the equivalent. A table 12 is adapted to slide along the horizontal guideways 10 and has formed integral therewith, or fixedly positioned thereon, an upright stand 14. The upright stand 14 cooperates with the table 12 to maintain vertical guideways 16 properly aligned so as to permit vertical up and down movement of a tool support 18 slidably joined to the vertical guideways 16. The tool support 18 has mounted thereon a tool drive motor 20 that through a belt 22 revolves a spindle 24 to which a copying or cutting tool 26 is secured adjacent a workpiece or template 28. An adjustable support for the workpiece 28 will be described in detail subsequently under the heading "Workpiece Support." Other modes of driving the copying tool 26 may be employed as demanded by particular applications. Also, the versatility of the apparatus is increased if provision is made for revolving the copying tool at different speeds within some select range.

To maneuver the cutting tool 26 relative to the workpiece 28, two similar drive trains are employed, one a horizontal drive train denoted generally at 50 and the other a vertical drive train shown at 52. The horizontal drive train 50 includes a drive motor 54, a gear box 56, and a drive screw 58, whereas the vertical drive train 52 consists of a drive motor 60, a gear box 62, and a drive screw 64. Drive in each train proceeds from the respective drive motor through the gear box and to the drive screw. Each gear box is appropriately arranged to provide the required drive direction change at a desired drive ratio, which may be altered if wanted. From the drive screws 58 and 64 the rotation thereof is transferred in any suitable way, e.g., stationary nuts (not shown) attached both to the table 12 and the tool support 18. Hence, with only the horizontal drive train 50 effective, the cutting tool 26 will be moved in a horizontal plane corresponding to that of the table 12. Similarly, with only the vertical drive train 52 effective, movement of the cutting tool 26 coincides with the movement of the tool support 18 along the guideway 16.

Preferably, both the horizontal and vertical drive motors 54 and 60 are operated by fluid pressure delivered thereto under the control of horizontal and vertical fluid pressure control units 66 and 68. By utilizing fluid pressure operated motors, response is instantaneous and the fluid has an inherent ability to absorb drive line shocks such that together smooth responsive operation is obtained. Both of the fluid pressure control units 66 and 68 are of the character employing force motors and servo valves, the function of which is well known.

Because the two control units 66 and 68 are identical, and because each is of well-known construction, only one, that for the horizontal drive train 50, will be somewhat briefly described. As demonstrated in FIGURE 2, a servo valve, designated generally at 70 and formed with a series of spaced lands 72, 74, 76, and 78, is slidably positioned within a bore in a valve body 80. Centering springs 82 and 84 act on opposite ends of the servo valve 70 and maintain the servo valve 70 in the depicted center position in the absence of any force except the spring bias. When in this center position, lands 72 and 74 and lands 76 and 78 respectively interrupt communication between restricted exhaust ports 86 and 88 and motor inlets 90 and 92. Each of the exhaust ports 86 and 88 is slightly restricted so as to improve operational responsiveness. With both of the exhaust ports 86 and 88 cut off or out of communication with the motor inlets 90 and 92, fluid pressure in a main supply line 94 delivered thereto by an appropriate pump 96 at a pressure determined by a conventional pressure regulating valve 97, is supplied to both motor inlets 90 and 92.

A suitable solenoid operated valve 98 in line 94 between the pump 96 and the regulating valve 97 interrupts communication therebetween whenever the solenoid winding therefor is deenergized. The function and purpose of this valve 98 will become apparent.

With this arrangement, when the servo valve 70 is in the center position, the drive motor 54 is ineffective, but when the servo valve 70 is maneuvered in either direction, the pressure supply to one of the motor inlets 90 or 92 will be reduced or entirely cut off with the result that the pressure being delivered to one or the other of the motor inlets 90 and 92 will dominate and the motor 54 will be rotated thereby in the corresponding direction. The inlet to the motor 54 with the reduced or cut off pressure will be relieved through one or the other of the exhaust ports 86 and 88.

The production of the variable pressures for maneuvering the servo valve 70 is under the control of a force motor denoted generally at 100. For this control the motor 100 employs a reed valve 102 pivoted at 104 and arranged so as to enter the valve body 80 as viewed. The point of entry of the reed valve 102 into the valve body 80 may be sealed by a seal element 106 or may be left open if drainage to sump is possible. Energization of one or the other of opposite relays 108 and 110 respectively by regulating signal voltages respectively from an X-axis summing circuit 112 and an X-axis servo amplifier 114 and a Y-axis summing circuit 116 and a Y-axis servo amplifier 118 will cause the reed valve 102 to pivot about the axis determined by the pivot point 104 and in so doing the end entering the valve body 80 will restrict one or the other of adjacent control orifices 120 and 122 thereby altering the pressure of the fluid acting on the opposite ends of the servo valve 70. The supply of fluid pressure for this purpose is delivered by a branch 124 of the supply line 94 through opposite supply orifices 126 and 128 to the end areas of the servo valve 70. The supply orifices 126 and 128 create a pressure differential between the branch 124 and the chambers at opposite ends of the servo valve 70. Without these orifices 126 and 128, control would not be possible since fluid pressure would be relieved via an exhaust chamber 130 through either of the control orifices 120 and 122 or both.

If the reed valve 102 is in the illustrated center position, the fluid pressure acting on opposite ends of the servo valve 70 will be relieved through the exhaust chamber 130. However, if the reed valve 102 abuts or partially restricts one of the control orifices, e.g., control orifice 120, the pressure upstream thereof will build up. This pressure, when adequate, will move the servo valve 70 to the right reducing or cutting off the supply of fluid pressure to the motor inlet 90 while increasing the supply of fluid pressure to the opposite motor inlet 92. Accordingly, the horizontal drive motor 54 will revolve in a corresponding direction. Meanwhile, the motor inlet 90 will be partially or completely relieved through exhaust port 86. The same events will occur in reverse if the reed valve 102 restricts control orifice 122, i.e., the servo valve 70 now will be moved to the left so that the pressure to the motor inlet 90 will dominate while that in the motor inlet 92 is partially or completely relieved via exhaust port 88. With this latter situation, the horizontal drive motor 54 will reverse in direction of rotation.

On the side of the apparatus opposite the workpiece 28, a master draft table 132 is pivotally jointed to some fixture such as the apparatus base and has attached thereto a master draft 134, which may be a print, drawing, or the equivalent having a contour line as line 136 to be traced. The pivotal movement of the master draft table 132 permits the table to be positioned in a horizontal plane when the master draft 134 is attached. Then the table 132 may be moved to the demonstrated vertical position and locked in place. A number of lamps 138 are positioned in the vicinity of the master draft 134 so as to light up the part of the contour line 136 to be traced. These lamps 138 may be secured to the table 132 and/or arranged for movement with the tool support 18. Additional lamps may be employed as needed.

Figure 3:
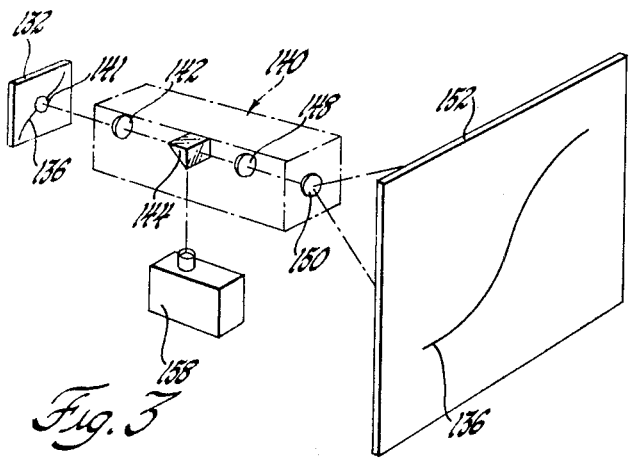
FIGURE 3 is a diagrammatic illustration of the apparatus optical system.

An optical system denoted generally at 140 and displayed schematically in FIGURE 3, is so arranged as to provide dual images of the portion (enclosed by a circle 141) of the contour line 136 being traced. This is effected by splitting the image in a known way transferred from a lens 142 to a split image lens 144. One of the images is transferred through an upright tower 146 (FIGURE 1) carried by the tool support 18 and projected at a magnification determined by magnifying lens 148 and 150 on a frosted glass screen 152 at the top of the tower 146. The other image proceeds through an opening 154 at the base of the tower 146 and is correlated with a reticle 156 simulating the copying tool 26 and an image producer as TV camera 158. Both the reticle 156 and the TV camera 158 are accurately positioned on a shelf 160 secured to the tool support 18, so that an electronic image is developed thereby showing the outline of the reticle 156 superimposed on the contour line image. This enables an accurate reproduction of the disposition of the tool 26 relative to the contour line 136 being copied to be obtained, e.g., as viewed in FIGURE 4, and is accomplished in a well-known manner by coordinating the focal lengths of the TV camera 158 and the split image lens 144.

The image projected onto the frosted screen 152 is utilized by a tracer mechanism denoted generally at 162 for the automatic aspect of the apparatus, whereas the image to the TV camera 158 is through a suitable closed system projected onto the screen of a TV viewer 164 remotely positioned from the apparatus at an operator's station as control panel 166 containing various manually operated controls. This permits the operator's station to be in a room different from the apparatus, affords a better picture of the cutting action, and protects the operator from the dangers inherent in any machining process.

TRACER MECHANISM

The tracer mechanism 162 develops, as will become apparent, when off-course or off-line relative to a contour line, error signals that are used in operating the control units 66 and 68. As best shown by FIGURE 1, a bracket 168 is suitably mounted both for movement with the tool support 18 and for revolvable movement relative thereto. The disposition of the bracket 168 relative to the optical tower 146 permits a photosensitive device denoted generally at 170 to be located above the screen 152. The photosensitive device 170 is made up of a photohead 172 that is movable along a drive arm 174 for a reason to be explained. The photohead 172 carries a set of on-line or on-course photocells 176, a set of off-line or off-course photocells 178, and two sets of steering or guidance photocells 180 and 182 all arranged when an on-course path is being followed as illustrated in FIGURE 4.

The operation of the individual photocells is well known, and of course, the relationships may be altered to fit requirements of different applications. Briefly, when a photocell is arranged in series with a voltage source and a load, dark objects cause the photocell to function somewhat as a high resistance; therefore, all of the voltage drop or substantially all of the voltage drop occurs across the photocell and none happens across the load. With a light object, the resistance of the photocell to current flow is less, and hence, the voltage drop is not as great across the individual photocells.

Since it is desirable to use different size cutting tools and also because cutting tools wear, the movement of the photohead 172 mentioned will compensate for these different size cutting tools. To explain, it must be kept in mind that the contour line 136 appearing on the screen 152 of the tower 146 is considerably magnified, e.g., 20 to 1. Therefore, the radius about which the photohead 172 revolves, will have to be a predetermined amount greater than the actual radius of a circular cutting tool. For instance, assume that a contour line with the configuration depicted in FIGURE 4d is to be cut. Obviously, if the tool radius is greater than the radius of the curve, the line cannot be reproduced unless the tool diameter is reduced to an appropriate size. The same applies to the radius on which the photohead 172 operates, for the photohead radius must be reduced in order to also maneuver around the 20–1 magnified curve. This is done by sliding the photohead 172 back and forth on the drive arm 174. To obtain accuracy, gauges or the equivalent may be positioned along the drive arm 174 so as to permit very accurate positioning.

Figure 4:
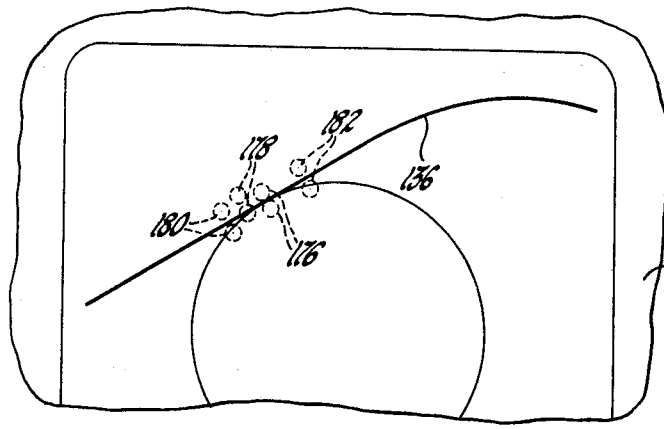
FIGURE 4 is a view of the reproducing operation as observed on a TV viewer.

Referring to FIGURE 4, which represents the picture seen on the TV viewer 164 when on-line or on-course operation is occurring, the relative positions of the photocells have been shown for explanation purposes only. Actually they will not appear on the screen of the TV viewer 164. The outputs of the various sets of photocells indicate their disposition relative to the contour line 136, and it is these error signals that are utilized, as will become evident, for reproducing the contour line 136 on the workpiece 28.

Figure 4A:
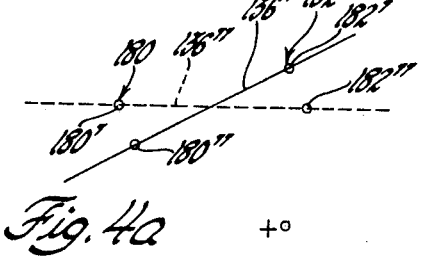

The use of two sets of steering photocells 180 and 182 in maintaining parallel alignment of the photohead 172 with respect to the contour line 136 enhances accuracy since with just one set it can be seen that the contour line 136 may be positioned parallel to the direction of movement of this single set only with respect to the set whereas other parts of the photohead 172 may be out of parallel alignment therewith, i.e., pursuing a difference source. The diagonally opposite photocells of these steering sets 180 and 182 are so connected that their outputs when a misalignment exists produce a signal of a polarity and a magnitude determined by the direction and amount of error. For example, as seen in FIGURE 4a, the bottom or lower photocell 180″ of the set 180 and the top photocell 182′ of the set 182 may be both positioned over the same line 136′. An error signal will be developed such that the photohead 172, assuming O to be the rotational axis thereof, will have to be revolved counterclockwise to attain the FIGURE 4 parallel alignment and these two photocells 180″ and 182′ being connected with their outputs joined will provide an error signal voltage of one polarity, e.g., positive, and of a magnitude equivalent to the amount the photohead 172 must be revolved in a counterclockwise direction. On the other hand, if the misalignment is such that the top photocell 180′ of the set 180 and the lower photocell 182″ of the set 182 are positioned above the contour line 136″, an error signal voltage will be produced of an opposite polarity, negative if the other is positive, and of a magnitude that will cause the photohead 172 to be revolved in a clockwise direction until the photocells are properly aligned with the contour line 136″ as in FIGURE 4.

With these two sets of steering photocells 180 and 182 arranged to have the outputs of the diagonally opposite photocells joined together, no error signal will be developed as long as the two sets of photocells 180 and 182 are parallel to the contour line 136, but this does not mean that the photocells for each set must straddle the line. On the contrary, they may be considerably displaced from the contour line 136 while following a parallel course and no error signal will be developed. Because of this, the on-line set of photocells 176 is incorporated in the photosensitive device 170 for maintaining the tool 26 normal to the contour line 136. These two on-line photocells 176 if on-course straddle the contour line 136 and no error signal is produced, but if there is a slight lateral deviation, although proper parallel alignment exists relative to the two sets of steering photocells 180 and 182, an error signal will be developed of a polarity determined by the side of the contour line 136 that the tool 26 has moved off-course, and of a magnitude corresponding to the off-course distance.

The off-line set of photocells 178 is intended to cause the apparatus to be stopped when the off-course error exceeds some predetermined amount. Normally, as viewed in FIGURE 4 and as will be explained, when on-course the off-line photocells 178 will produce a signal since the outputs therefrom will not be balanced with one of the photocells positioned over the contour line 136.

The error signals from the on-line set of photocells 176, and the off-line set of photocells 178 and the two sets of steering photocells 180 and 182 are transferred respectively through appropriate preamplifiers 184, 186, and 188. The outputs of these preamplifiers 184, 186, and 188 are in turn joined to a brush and slip ring arrangement displayed at 190 and the various error signals are then picked off in this manner. By having the preamplifiers on the input side of the slip ring arrangement 190, much of the noise from the slip rings is not induced into the control system, and therefore, the arrangement offers an advantage in this respect.

The number of photocells in each grouping as sets 180, 182, 178, and 176 and their capacity will, of course, be determined by the application of the apparatus and accordingly will influence the strength of any signals developed. With a strong signal, the influence on the operation of the tracer mechanism 162 from external sources, e.g., intersecting lines is greatly reduced.

Because there may be different lighting conditions and because the reflectivity of different master drafts, one may be dark and the other relatively light, provision is made for balancing the output from the photocells in each of the several sets. This is necessary because two otherwise similar photocells will generally not, under identical conditions, have the same output and the difference in output would produce an error signal in the system. The balancing of the outputs is accomplished by a lighting and reflectivity compensator shown generally at 192 in FIGURE 9.

Figure 5:
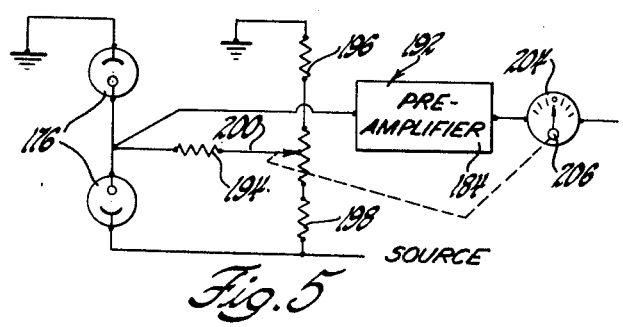

The outputs of each related set of photocells may be balanced in the same manner, e.g., a Wheatstone bridge; hence, only the one shown in FIGURE 5 will be described. The others will be exactly the same and the arrangement may be applied as will be understood by those versed in the art. As seen in FIGURE 5, the outputs of the on-line set of photocells 176 are connected to the input of the preamplifier 184. If both of the photocells 176 are positioned over an area formed of material with the same degree of reflectivity and provided with the same amount of light, the bridge should be balanced. Since the outputs generally will not be balanced, then a variable resistor shown at 194 is installed in the circuit therefor and arranged both in series between a grounded resistor 196 and a resistor 198 in parallel with a voltage source for the photocells 176. An adjustable arm 200 for the variable resistor 194 extends to the photocell anodes both of which are joined to the input of the preamplifier 184, and has a suitable connection with an ammeter 204 or the equivalent communicating with the output of the preamplifier 184. If the outputs from the two photocells are in balance, the needle of the ammeter 204 will be centered. If not, a knob 206 may be maneuvered so as to alter the setting of the adjustable arm 200 and cause the needle to be returned to the centered position. The variable resistor 194 therefore functions to establish a reference voltage by causing more or less current flow to the output circuit of the on-line set of photocells 176.

To obtain different polarities, a reference voltage, e.g., −85 volts is selected for maintaining the needle of the ammeter 204 centered. Then, if the output is less than −85 volts, an error signal of one polarity will be produced and if the error signal is greater than the −85 volts, an error signal of an opposite polarity will result. Hence, the polarity will determine on which side of the contour line 136 the photohead 172 has moved and provide an error signal of the proper magnitude and polarity for making the necessary correction.

As mentioned, the off-line set of photocells 178 cause operation of the apparatus to be interrupted if the off-course error is too great. The off-line error signal developed when the off-course error has not exceeded the prescribed limits is amplified by a suitable amplifier 208 and this amplified error signal, as seen in FIGURE 9, causes a relay 210 to be energized with the result that contacts 210a are normally open and contacts 210b are normally closed. If the off-course error is too great, then the off-line error signal is substantially reduced so that the relay 210 is deenergized. As a result, contacts 210a will be closed and contacts 210b will be opened. Contacts 210a control a circuit for a lamp 216, which will be stationed on the operator's control panel 166 so as to light up when off-course any prescribed amount. By opening the contacts 210b, the circuit to the solenoid operated valve 98 will be interrupted or opened, and hence, the solenoid winding will be deenergized so as to cause the valve 98 to interrupt the supply of fluid pressure to the motors 54 and 60. This stops automatic operation until the tool 26 is brought back on course in a way to be explained.

The steering error signals are amplified by a suitable D.C. amplifier 218 and then are transferred through a manual-automatic switching circuit shown at 220 in FIGURE 9a. In this switching circuit 220 a pair of contacts 222a (seen in FIGURE 6), which are closed during automatic operation by a relay 222 seen in FIGURE 8, are closed while related contacts 226a normally closed during manual operation are opened by a relay 226. Assuming that the various contacts are opened and closed for automatic operation, the circuit in FIGURE 6, including parallel resistors 230 and 232, from the D.C. amplifier 218 to a magnetic amplifier 234 of appropriate construction will be completed. The operation of the magnetic amplifier 234 is well known and in this embodiment the magnetic amplifier 234 is joined to a Scott two-phase transformer 236 in such a manner that one phase operates a two-phase motor 238 directly, whereas the other phase is subject to the control of the D.C. steering error signal. The polarity and magnitude of the D.C. steering error signal will determine the direction and speed of rotation of the two-phase motor 238.

Associated with the two-phase motor 238 and revolvable thereby is a D.C. tachometer generator 240 arranged to produce a feedback voltage corresponding to the speed of rotation of the two-phase motor 238. Also, this feedback voltage may be altered by any suitable adjustment, e.g., by variable resistors in the manner to be explained with respect to the adjustments of the feedback signal voltages supplied the X and Y-axis summing circuits 112 and 116. This feedback voltage is utilized by the magnetic amplifier 234 to alter the influence of the error signals such that stability of operation results, i.e., minor speed fluctuations do not influence the operation nor does so-called overshooting occur; for otherwise, the two-phase motor 238 with a large magnitude error signal if not reduced by the feedback voltage would be caused to revolve too fast. If revolving too fast, the motor 238 tends to pass the desired point.

Figure 2:
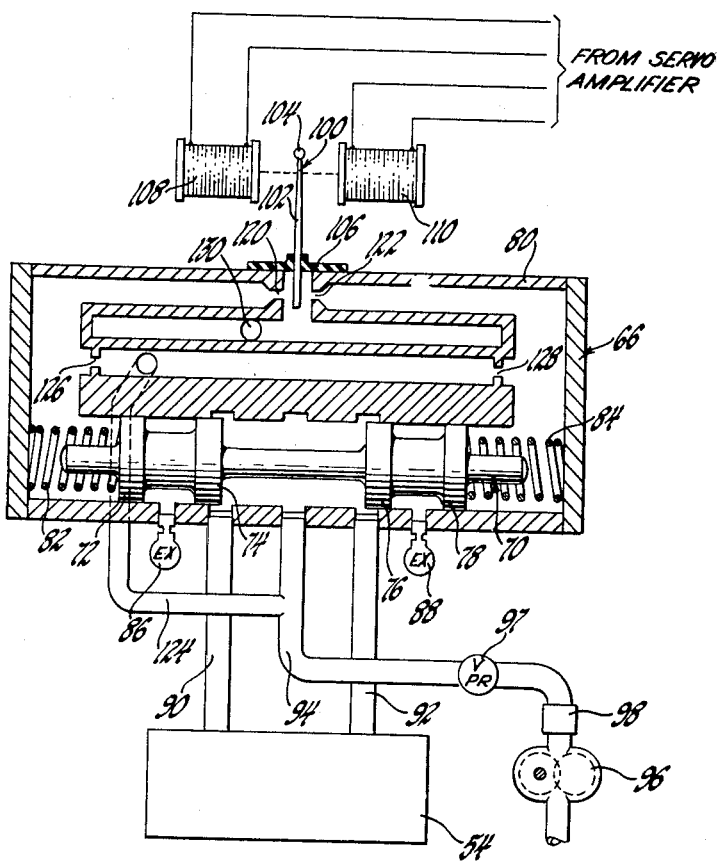
FIGURE 2 is a diagram of a pressure fluid system for the apparatus.

The two-phase automatic guidance or steering motor 238, as can be observed both in FIGURES 1 and 2, revolves a shaft 242 and this shaft in turn causes the drive arm 174 to turn the bracket 168, and accordingly the photohead 172, clockwise or counterclockwise as required and as explained with respect to FIGURE 4a. A speed reducing gear box 244 stationed on the output side of the two-phase motor 238 offers a speed reduction determined by the application. On the output side of the gear box 244 a suitable slip clutch 246 is positioned and set to slip at a predetermined torque so as to protect the gear box 244 from damage in case the bracket 168, the photohead 172, or some other part of the drive train offers excessive resistance sufficient to damage the gear box 244. Next in order, continuing downwardly from the slip clutch 246 and positioned on the shaft 242 are a synchro 248, and two impedances, as automatic steering sine-cosine potentiometer 250 and on-line sine-cosine potentiometer 252, the functions and purposes of which will be hereinafter explained.

The off-course error signal is amplified by a differential amplifier 254, FIGURE 9, which may be a conventional amplifier with a phase inverter circuit or the equivalent, correlated so that there are two outputs from the amplifier 254 equal in magnitude but opposite in polarity. The reason for the dual outputs of opposite polarity can be best understood by reference to FIGURE 7 and the demonstrated arrangement of the on-line sine-cosine potentiometer 252. As shown, the potentiometer 252 includes a stationary winding 256 connected to the output lines 258 and 260 from the differential amplifier 254 and are provided with ground connections at 262 and 264. An X-axis contact arm 266 and a Y-axis contact arm 268, each disposed 90° apart and each revolvable by the shaft 242, coact with the winding 256 to produce a control voltage determined by the position of the shaft 242 and the magnitude of the input off-course error signal. The X-axis arm 266 and the Y-axis arm 268 are connected respectively through resistors 270 and 272 and through the manual-automatic switching circuit 220 to the X and Y axis summing circuits 112 and 116. The switching circuit 220 includes automatic and manual X-axis contacts 274a and 274b and automatic and manual Y-axis contacts 274c and 274d, all operated by a relay 274, illustrated in FIGURE 8.

As can be seen from FIGURE 7, if automatic operation is established, the automatic X and Y axis contacts 274a and 274c are closed while the manual X and Y axis contacts 274b and 274d are open. If the reverse is true, i.e., manual operation is wanted, the manual X and Y axis contacts 274b and 274d connect the lines extending to the summing circuits to ground and the outputs from the potentiometer 252 do not influence the operation of the X and Y axis summing circuits 112 and 116.

To further understand the operation of the on-line sine-cosine potentiometer 252, the position depicted in FIGURE 7 will first be considered. As can be observed, the X-axis arm 266 is grounded at 262, whereas the Y-axis arm 268 is in contact with the winding 256 at the output line 260. There will be no X-axis signal with this disposition of the potentiometer 252, but there will be a maximum Y-axis signal of a polarity determined by the output line 260. To explain this change of polarity, reference is made again to FIGURE 4d where the conventional X and Y axes are shown and the contour line is displayed with relation thereto. Assuming initially that the on-line photocells 176 are in the top position so that a negative output is developed due to the off-course error, then if this off-course error is maintained and the set of photocells 176 continue around the curve in the direction of the arrow, i.e., in a counterclockwise direction, the disposition of the photocells 176 relative to the line will be that viewed below the X-axis. Under these conditions the photohead 172 will have been rotated 180°. When the photocells 176 were above the X-axis, to correct the off-course error required that the photohead 172 be laterally displaced downwardly in the direction of the arrow and the correction was determined by a negative signal. Now, with the photocell 176 in the position below the X-axis, a correction will have to be made by moving the photohead 172 upwardly in the direction of the arrow if the two photocells 176 are to straddle the line in the on-course position. But, the error signal is still negative and this negative signal causes opposite movement of the photohead 172. However, by revolving the photohead 172–180°, the Y-axis arm 268 will contact a point opposite the positive output 258 and the proper correction can be made. Therefore, by having both a positive and negative signal of the same magnitude produced from a single error signal, the proper corrections can be made as the photohead 172 revolves and this situation explained relative to FIGURE 4d does not present a problem.

Figure 4B:
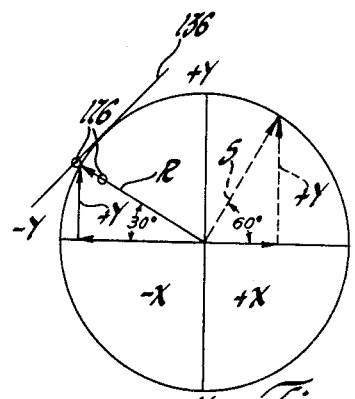
Figure 4C:
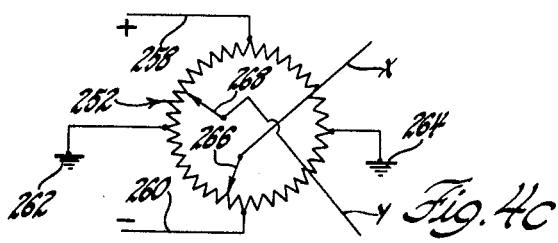
Figure 4D:
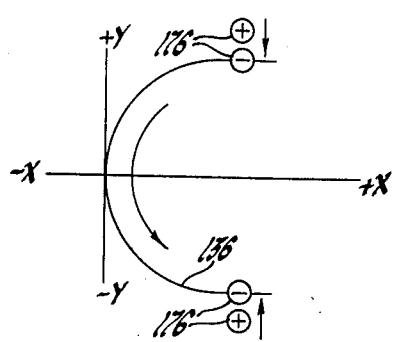

So as to aid in understanding the other sine-cosine potentiometers employed in the system as well as the on-line potentiometer 252, attention is directed to FIGURE 4c where the arms 266 and 268 have been displaced so that each will have a voltage applied thereto. The Y-axis controlled signal will be positive and the X-axis control signal will be negative in these positions. The magnitudes of each when vectorially correlated on the FIGURE 4b conventional diagram commonly used for solution of circular trigonometric functions will result, e.g., in an angle of 30° as indicated. The resultant of the negative X value and the positive Y value will require movement equivalent to the value R and in the direction thereof for the photocells 176 to be positioned straddle the line 136 shown with relation thereto. The resultant R is of course the vectorial sum of the X and Y values and it is these X and Y values that cause the drive motors 54 and 60 to be operated so as to result in movement of the tool 26 corresponding in direction and magnitude to the resultant R.

The automatic steering sine-cosine potentiometer 250 functions very similarly to the on-line potentiometer 252 and includes a stationary winding 284, that is joined to input lines 286 and 288 and that has ground connections at 290 and 292. The input lines 286 and 288 provide signal voltages of the denoted polarity but of equal magnitudes corresponding to the desired speed of operation as will become evident. An X-axis contact arm 294 and a Y-axis contact arm 296 are connected respectively through resistors 298 and 300 and through the manual-automatic switching circuit 220 and the X and Y axis summing circuits 112 and 116. As with the on-line potentiometer 252, automatic and manual X-axis contacts 302a and 302b and automatic and manual Y-axis contacts 302c and 302d are all operated by a relay 302 such that when automatic operation is selected, the automatic X and Y axis contacts 302a and 302c are closed and normally closed manual X and Y axis contacts 302b and 302d are opened for reasons to become apparent.

As will be noted, the X-axis arm 294 for the automatic steering potentiometer 250 is 90° displaced from the X-axis arm 266 for the on-line potentiometer 252. The same is also true for the Y-axis arms. The explanation for this is obvious when again considering FIGURE 4b, for as can be observed there, it is assumed that the photohead 172 is proceeding upwardly along the line 136 and in parallel alignment therewith but off-course, any correction made to bring the tool 26 back on course will be at 90° to the line 136 or normal with respect thereto.

Additionally, assuming that the slope of the line to be traced is at an angle of 60°, as the line S in FIGURE 4b, the steering control signals for following the slope of 60° will have positive X and Y axis values determined respectively by the cosine and sine functions of the 60° angle. The sum of these two X and Y axis values will always result in the same value, when summed vectorially. Hence, if the speed desired of the tool 26 relative to the workpiece 28 is 10 inches per minute, regardless of the slope of the line S, the speed will always be 10 inches per minute, a desirable feature since constant speed is wanted for efficient operation.

Because, as mentioned, the arms of the two potentiometers 250 and 252 are linked together 90° apart, the X-axis value for determining the on-line control signal with respect to line S will be determined by the sine function of the 60° angle, whereas the Y-axis value will be determined by the cosine function of the 60° angle. This is apparent from the diagram in FIGURE 4b since these values would produce a line with a slope equivalent to that of the line R.

The speed signal voltages supplied to the input lines 286 and 288 on the automatic steering sine-cosine potentiometer 250 are selected manually at the operator's panel 166 by maneuvering a dial 312. This dial 312 is linked or otherwise secured to the also linked contact arms 314 and 316 as observed in FIGURE 7 and these arms 314 and 316 in turn coact respectively with speed control potentiometers 318 and 320. The speed control potentiometer 320 is connected to a negative voltage source through a fixed resistor 322 and a variable resistor 324 whereas speed control potentiometer 318 is connected to a positive voltage source and through a fixed resistor 326 and a variable resistor 328. The relationship of these resistors will produce output voltages of opposite polarity but of equal magnitude, the magnitude being determined by the speed desired. If a greater speed is wanted, then the potentiometer arms 314 and 316 are positioned so that the voltage drop is less and when less speed is required, the arms 314 and 316 are positioned so that the voltage drop across the potentiometer is increased. Consequently, when these potentiometers 318 and 320 are combined with steering potentiometer 250, the tool 26 is caused to be maneuvered in the direction determined by the position of the arms 294 and 296 for the potentiometer 250 at a speed determined by the speed control potentiometers 318 and 320.

As seen in FIGURE 9a, an appropriate limit switch control 330 is actuated by the movements of the speed control dial 312. This limit switch control 330 communicates with the solenoid operated valve 98 and functions when the speed control dial 312 is turned to the Off position so as to cause the solenoid winding for the valve 98 to be deenergized thereby interrupting the supply of fluid pressure to the motors 54 and 60. Thus, the limit switch control 330 precludes the possibility of tool creeping movement when the speed control 312 is in the Off position.

Positioned above the speed control dial 312 in FIGURE 9a is the manual steering control dial 332 also shown in FIGURE 1 on the operator's panel 166 to the right of the speed control dial 312. The manual steering control 332 revolves a manual guidance or steering shaft 334, which in sequence operates a cam limit switch 336, a synchro 338, and a manual steering sine-cosine potentiometer 340. Also mounted on the same shaft 334 is a slip clutch 342, a speed reduction gear box 344, and a motor 346. The gear box 344 and the slip clutch 342 perform the same functions as the gear box 244 and the slip clutch 246 on automatic steering shaft 242.

The manual steering sine-cosine potentiometer 340 (FIGURE 7) is similar to the automatic steering potentiometer 250 and includes a winding 348 connected respectively to branches 350 and 352 of input lines 288 and 286 from the speed control potentiometers 318 and 320 and grounded at 354 and 356. An X-axis contact arm 358 extends to the manual-automatic switching circuit 220 through a resistor 360, and a Y-axis contact arm 362 extends to the same circuit 220 through a resistor 364. The X-axis and Y-axis arms 358 and 362 are maneuvered by the shaft 334 and as with the potentiometers 250 and 252, the arms thereof are displaced 90° apart. When the manual X and Y axis contacts 302b and 302d are in the normally closed position, steering may be accomplished in the same manner as that done by the two-phase motor 238 in maneuvering the photohead 172.

The cam limit switch 336 is operated by appropriate switch operators (not shown) in turn actuated when the table 10 and the tool support 18 attain substantially all of the permitted travel in their respective directions. For instance, if the tool support 18 has moved up or down the maximum allowed extent, the corresponding switch operator will actuate the cam limit switch 336 and cause the solenoid winding for the solenoid operated valve 98 to be deenergized. As a result, the fluid pressure supply to the motors 54 and 60 is interrupted and accordingly travels of the table 10 and tool support 18 are stopped before damage to the apparatus can occur.

Both of the summing circuits 112 and 116 are similar, and hence, it will be only necessary to describe one. Considering then the X-axis summing circuit 112, FIGURE 7, this circuit has an X-axis steering control signal voltage input 366 from both the automatic and the manual steering potentiometers 250 and 340, an X-axis off-course control signal voltage input 368 from the on-line potentiometer 252, an oscillating signal voltage input 370 joined to any suitable dither oscillator 372 through a capacitor 374, and a feedback signal voltage input 376.

The dither oscillator 372 gives a continuously oscillating effect to the summed signal voltage so as to keep the components of the control units 66 and 68, particularly the force motors and servo valves "alive" or continuously oscillating as well as the other elements of the control system. This gives instantaneous response by removing the influence of static friction. The capacitor 374 is utilized in conjunction with the dither oscillator 372 so as to eliminate the influence of the summing circuit on the dither oscillator 372.

To obtain the feedback signal voltage, an X-axis D.C. tachometer generator 378 is arranged as demonstrated in FIGURE 1 for rotation with the motor 54 and thus produces a feedback signal voltage that corresponds to the speed of the screw 58. This feedback signal voltage is adjusted to a desired value by variable resistor 380 (see FIGURE 7) situated in the input 376 and is utilized to prevent overshooting as previously mentioned, as well as for removal of the influence of minor speed fluctuations on the control units 66 and 68. A grounded capacitor 382 provides some filtering and also aids in removing fluctuations from the system. The impedances 384, 386, 388, and 390 will normally be resistors unless the signal voltages are to be modified in some other way.

All of the various signal voltages are added algebraically by the circuit 112 and the sum is applied to a gain potentiometer 392 positioned at the input to the amplifier 114. Hence, an amplified regulating signal voltage is afforded for operating the control unit 66.

The Y-axis summing circuit 116 and the components thereof have been assigned the same numerals as the X-axis summing circuit 112 but with primes added thereto. For instance, the Y-axis steering control signal voltage input is assigned the numeral 366′, the Y-axis off-course control signal voltage input the numeral 368′, and the Y-axis D.C. tachometer generator the number 378′.

The feedback input 376 has installed therein grounded X-axis contacts 394a, whereas the Y-axis feedback signal voltage input 376′ has grounded Y-axis contacts 394b.

Both of these contacts 394a and 394b are operated by a relay 394 in turn under the control of a rapid traverse switch 398 displayed in FIGURE 8 and which may be made accessible to the operator, if desired, by placing within the control panel 166. When this switch 398 is actuated, relay 394 is energized and the contacts 394a and 394b are closed, thus shorting the feedback signal voltages to ground and eliminating the influence thereof on the summing circuits 112 and 116. As a consequence, the regulating signal voltage developed will be of a greater magnitude and the motors 54 and 60 will be operated at a faster speed to give rapid movement of the tool 26 at certain times for instance when it is desired to move the tool 26 quickly to the line to be reproduced.

As will be explained during the operational summary, both manual and automatic operation are possible, therefore, it is necessary to synchronize the rotation of the manual steering shaft 334 with that of the automatic steering shaft 242. There are many ways to accomplish this as those versed in the art will understand. However, it is preferred that this be accomplished electrically. For this purpose the synchros 248 and 338 mentioned previously are employed.

Figure 6:
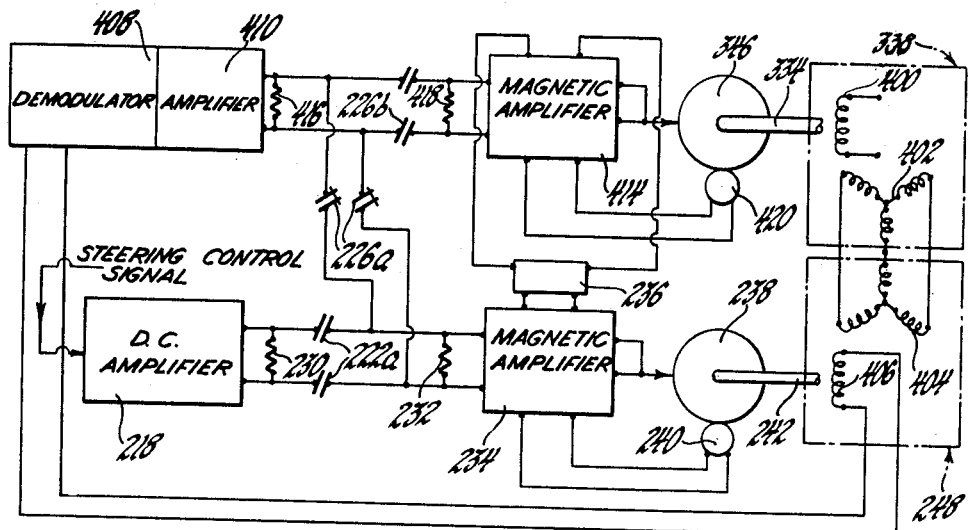

Both of the synchros 248 and 338 may be of any known construction such as shown schematically in FIGURE 6. As there depicted, the manual steering shaft synchro 338 is disposed so as to function as the transmitter and therefore has a rotor winding 400 revolvable by the shaft 334. Stator coils 402 arranged in a Y configuration are positioned adjacent the rotor winding 400 and the rotor winding 400 is furnished with an A.C. voltage through slip rings or the equivalent from an external source. The automatic steering shaft synchro 248 accordingly will function as a receiver and has stator coils 404, also aligned in a Y, connected to the manual synchro stator coils 402. A rotor winding 406 is revolvable with the automatic steering shaft 242. If preferred, the stator coils may be revolved with the shafts and the rotor windings held stationary.

If the shaft 242 is out of synchronism with the shaft 334, an A.C. error signal voltage will be developed in the automatic synchro rotor winding 406 indicating the amount that the shaft 242 is out of angular alignment with the shaft 334. To utilize this A.C. error signal voltage, it is necessary to develop a D.C. equivalent, and hence, rotor winding 406 is joined to a demodulator 408, which develops from the A.C. error signal voltage a D.C. equivalent error signal voltage. This D.C. signal voltage is increased to a desired level by an amplifier 410 and if manual operation is effective, this D.C. error signal will be applied to the magnetic amplifier 234 through contacts 226a and cause, in the foregoing described manner, the two-phase motor 238 to be rotated sufficiently to bring the shaft 242 back into synchronism with the manual steering shaft 334.

If, on the other hand, automatic operation is selected, the contacts 226a will be opened and contacts 226b closed by relay 226. This completes a circuit, similar to that between the amplifier 218 and the magnetic amplifier 234, between the amplifier 410 and a magnetic amplifier 414. This latter circuit also includes parallel resistors 416 and 418. Hence, a D.C. error signal voltage developed in this manner will control the magnetic amplifier 414 in the same way as the magnetic amplifier 234 is controlled, i.e., the magnetic amplifier 414 will be connected to the same transformer 236 or a similar one with one phase thereof joined directly to the two-phase motor 346 while the other phase is controlled by this D.C. error signal voltage, such that the two-phase servo motor 346 is caused to revolve the shaft 334 sufficiently to bring the two shafts 242 and 334 into synchronism. The motor 346 and magnetic amplifier 414 also have a D.C. tachometer generator 420 and an adjustment to furnish a feedback voltage for the same reason mentioned with respect to the tachometer generator 240.

The manual-automatic switching circuit 220 is controlled by a manual-automatic button 422 at the operator's control panel 166 and this button 422 operates a manual-automatic switch 424 shown in FIGURE 8. The switch 424, when closed, completes a circuit extending from a power supply 426 to relays 274 and 302, 222 and 226. With the switch 424 closed then, automatic operation will take place since all of the associated normally closed contacts are open as contacts 274b, 274d, 302b, 302d, and 226a. Those contacts normally open, as contacts 302a, 302c, 274a, 274c, 226b, and 222a, will be closed, thus preparing the system for automatic control as will be explained in the operational summary.

Because it may be necessary to maintain the tracing mechanism 162 along a certain course when an intersection between lines is encountered, a freeze button 428 is placed also at the operator's control panel 166 for this function and operates a freeze switch 430 illustrated in FIGURE 8. With the freeze switch 430 in the depicted position, automatic control is possible since the relays 302, 222, and 226 can be energized when the manual-automatic switch 424 is closed. Assuming that the automatic control system is effective, by depressing the freeze button 424, the freeze switch 430 will open and the relays 302, 222, and 226 will return to the position in which the normally closed contacts 302b, 302d, and 226a controlled thereby are again closed as during manual operation. Specifically, the automatic steering control potentiometer 250 is rendered ineffective and the manual steering control potentiometer 340 effective when contacts 302a, 302c are opened and contacts 302b, 302d are closed. The automatic on-line signal potentiometer 252 maintains its status, the relay 274 continuing to hold contacts 274a and 274b closed, and the contacts 226a set up the described manual-automatic synchronizing between shaft 334 and 242. This part of the operation will be further explained during the operational summary.

OPERATIONAL SUMMARY

As has been previously mentioned several times, there are two aspects to the control of the reproducing apparatus. One offers manual control, which is possible through a manual control system, and the other is automatically achieved through the automatic control system.

*Manual control*

Manual control requires that the manual automatic switch 424 be open, and as a result, contacts 302b, 302d, 274a, 274d, and 226a will be closed and cause the associated circuitry to be effective. Also, preferably the off-course error signal voltage and its influence on relay 210 is eliminated during manual control so that the solenoid operated valve 98 will not be held closed, especially when the photohead 172 is a substantial distance off-course. For this purpose, a switch (not shown) or the equivalent, may be installed between the preamplifier 186 and the amplifier 208. Before any movement of the cutting tool 26 relative to the workpiece 28 can take place, the speed control dial 312 must be maneuvered towards the On position so as to cause limit switch control 330 to render the solenoid operated valve 98 ineffective to block pressure fluid from the control units 66 and 68. The corresponding speed control signals developed by the speed control potentiometers 318 and 320 will be supplied to both the automatic and manual steering control potentiometers 340 and 250, the manual steering potentiometer 340 only being effective. By now maneuvering the steering control dial 332, and while viewing the relative positions of the simulated cutter image and the image of the contour line 136 on the TV viewer 164, appropriate X-axis and Y-axis control signal voltages can be developed by the manual steering potentiometer 340 and applied to the X and Y-axis summing circuits 112 and 116. It should be kept in mind that these X-axis and Y-axis control signal voltages also include the desired speed signal. These control signal voltages then are summed along with the oscillating and feedback signal voltages and corresponding summed regulating voltages determined by the gain potentiometers 392 and 392′ are applied to the amplifiers 114 and 118. These amplified regulating voltages are delivered to the control units 66 and 68 whereupon the drive motors 54 and 60 cause movement respectively of the table 12 and the tool support 18 such that the cutting tool 26 is moved along a desired path, the resultant of the table and tool support movements. This desired path will, of course, coincide with the contour line 136 on the master draft 134 if tracing manually. Additionally, if the rapid traverse switch 398 is closed, the elimination of the feedback will permit the tool 26 to be maneuvered at a faster speed as has been indicated.

During manual operation the tracer mechanism 162 serves no function; however, the automatic steering shaft 242 is maintained synchronized with the manual steering shaft 334 so that at any time automatic control can be initiated without any lag or lost motion therebetween.

*Automatic control*

Before automatic control is initiated, it is assumed that the adjustments mentioned in the description of the manual control have been made, i.e., the outputs of the different sets of photocells are balanced, the photohead 172 is adjusted so as to correspond to the size of the cutting tool 26, the master draft 134 is in place, and the workpiece 28 has been installed to the workpiece support 441. The tracing mechanism 162 can now be moved manually to the on-course position while observing the TV viewer 164. If the speed at which this is done manually is not fast enough, the rapid traverse switch 398 can be closed to eliminate feedback to the motors 54 and 60 in the previously described way. When on-course, the depicted picture on the viewer 164 will appear, i.e., the image of the tool 26 and the image of the contour line 136 will be normal to each other. Next, the manual-automatic button on the control panel 422 is actuated to close the manual-automatic switch 424. All of the previously normally closed contacts are open and contacts 302a, 302c, 274a, 274c, 226b, and 222a closed by the associated relays 274, 302, 222 and 226.

With the tracer mechanism 162 operative, the steering sets of photocells 180 and 182 will be effective to develop a steering error signal whenever a parallel misalignment occurs relative to the contour line 136 being traced. Also, if off-course slightly, an off-course error signal will be developed by the on-line set of photocells 176. This assumes that the on-line set of photocells 176 are not far enough off-course to produce an off-course error signal adequate to cause the solenoid operated valve 98 to close and interrupt the supply of pressure fluid to the motors 54 and 60. The steering error signals will cause the two-phase motor 238, in the manner previously described, to rotate the photohead 172 so that the two sets of steering photocells 180 and 182 are again in parallel alignment with the contour line 136. At the same time, the automatic steering control potentiometer 250 utilizing the speed control signal will develop corresponding X and Y-axis steering control signals that are transferred to the summing circuits 112 and 116. Also, if there is an off-course error signal, this signal will be processed by the on-line potentiometer 252 and accordingly X and Y-axis control signal voltages will be developed and transferred also to the summing circuits 112 and 116. In both the X-axis and Y-axis summing circuits the appropriate axis steering control and off-course control signals will be formed along with the feedback signal voltage and the oscillating signal voltage, and a summation of these will be applied to the respective gain potentiometers 392 and 392′. After these summed regulating voltages are amplified, the appropriate corrections will be made in the direction of movement of the cutting tool 26 by control units 66 and 68 so that drive trains 50 and 52 will maneuver the table 12 and tool support 18 the necessary amounts.

As has been explained during the manual control description, the automatic steering shaft 242 and the manual steering shaft 334 are maintained in synchronism so that switchover from manual to automatic, and automatic to manual, can take place quickly. This enables the freeze control button 428 to be actuated at any time during automatic control, particularly when the tracing mechanism 162 is approaching an intersection of lines. For example, when crossing intersecting lines 30° or less apart, there is a possibility that the tracer mechanism 162 will follow the wrong line. To prevent the possibility, the freeze button 428 is depressed and this opens the freeze switch 430 so as to reinstate manual control long enough to move past the intersection of the lines. The operator, after depressing the freeze button 428, many manipulate the manual steering dial 332 if he desires; or, if the path is the same, the tracer mechanism 162 will continue on-course without any necessity for a correction. Once past the intersection of the lines, the freeze button 428 can be again actuated so as to return the control to automatic.

From the foregoing, it can be seen that the reproducing apparatus permits the cutting operation to be viewed at some remote point through the utilization of the closed TV system and that manual and automatic control are both possible, each being synchronized with the other. With rapid traverse and freeze controls, the effectiveness of the apparatus is enhanced. Also, the provision for balancing photocell outputs and adjustment of the position of the photohead affords versatility and enables easy and convenient calibrations to be made for different applications. The utilization of sine-cosine potentiometers results in a constant tool speed despite different line slopes and with the adjustable workpiece support work pieces may be placed anywhere within the confines of the support.

The invention is to be limited only by the following claims.

We claim:

1. In combination, drive means for maneuvering a tool relative to a workpiece, and a control system for the drive means including a manually operable speed control including two variable impedances maneuverable by the speed control to develop D.C. speed signals each of opposite polarity corresponding in magnitude to the desired speed and a manually operable direction control including a sine-cosine potentiometer in communication with the two variable impedances for the speed control and adapted when the direction control is actuated to develop a combined D.C. speed and direction signal of a polarity corresponding to the direction and speed of tool movement desired thereby facilitating 180° arcuate maneuvering of the tool relative to the workpiece in all directions at a constant speed determined by the setting of the speed control.

2. In combination, tool and workpiece supports so arranged as to have relative movement in two mutually transverse paths, drive means for producing the relative movement of the supports along the two paths, and a control system for the drive means comprising a manually operable speed control including two variable impedances connected to a source and maneuverable by the speed control so as to develop D.C. speed signals each of opposite polarity corresponding in magnitude to the desired speed and a manually operable direction control including a sine-cosine potentiometer coacting with the two variable impedances for the speed control so as to have opposite terminals thereof supplied each with one of opposite polarity speed signals and develop when the direction control is maneuvered a combined D.C. speed and direction signal of a polarity corresponding to the direction and speed of tool movement desired thereby facilitating 180° arcuate maneuvering of the tool relative to the workpiece, the polarity and magnitude of the combined speed and direction signal being utilized by the control system to cause the drive means to produce the corresponding relative movement of the supports for maneuvering the tool relative to the workpiece according to a desired scheme and in all directions at a constant speed determined by the setting of the speed control.

3. In combination, tool and workpiece supports so arranged as to have relative movement in two mutually transverse paths, drive means for producing the relative movement of the supports along the two paths, and a control system for the drive means comprising a manually operable speed control including two variable impedances connected to a source and maneuverable by the speed control so as to develop D.C. speed signals each of opposite polarity corresponding in magnitude to the desired speed, a manually operable direction control including a sine-cosine potentiometer coacting with the two variable impedances for the speed control so as to have opposite terminals thereof supplied each with one of the opposite polarity speed signals and develop when the direction control is maneuvered a combined D.C. speed and direction signal of a polarity corresponding to the direction and speed of tool movement desired thereby facilitating 180° arcuate maneuvering of the tool relative to the workpiece, the polarity and magnitude of the combined speed and direction signal being utilized by the control system to cause the drive means to produce the corresponding relative movement of the supports for maneuvering the tool relative to the workpiece according to a desired scheme and in all directions at a constant speed determined by the setting of the speed control, and switch means operable by the speed control when set for a predetermined minimum speed to render the drive means inoperative.

References Cited by the Examiner
UNITED STATES PATENTS

| | | |
|---|---|---|
| 2,537,770 | 1/51 | Livingston et al. |
| 2,784,359 | 3/57 | Kamm _____ 318—28 |
| 2,983,858 | 5/61 | Herndon. |
| 3,028,531 | 4/62 | Heiberger et al. _____ 318—257 |
| 3,040,221 | 6/62 | Fitzner. |

WILLIAM W. DYER, Jr., *Primary Examiner.*

LEON PEAR, *Examiner.*

UNITED STATES PATENT OFFICE
CERTIFICATE OF CORRECTION

Patent No. 3,187,247 June 1, 1965

Robert B. Colten et al.

It is hereby certified that error appears in the above numbered patent requiring correction and that the said Letters Patent should read as corrected below.

Column 1, line 20, for "inacurate" read -- inaccurate --; column 6, line 58, for "difference source" read -- different course --; column 16, line 15, for "many" read -- may --.

Signed and sealed this 23rd day of November 1965.

(SEAL)
Attest:

ERNEST W. SWIDER
Attesting Officer

EDWARD J. BRENNER
Commissioner of Patents